(12) United States Patent
Peters et al.

(10) Patent No.: US 8,903,632 B2
(45) Date of Patent: Dec. 2, 2014

(54) METHODS AND SYSTEMS FOR EXHAUST GAS RECIRCULATION COOLER REGENERATION

(75) Inventors: Eric David Peters, Lawrence Park, PA (US); Roy Primus, Niskayuna, NY (US); Paul Lloyd Flynn, Lawrence Park, PA (US); John Stephen Roth, Lawrence Park, PA (US); Franz-Joseph Foltz, Lawrence Park, PA (US); James Robert Mischler, Lawrence Park, PA (US); Luke Henry, Lawrence Park, PA (US); Roshan Shekhar Kotian, Lawrence Park, PA (US); Michael Easter, Lawrence Park, PA (US); Stephen Mark Geyer, Greencastle, PA (US)

(73) Assignee: General Electric Company, Schenectady, NY (US)

( * ) Notice: Subject to any disclaimer, the term of this patent is extended or adjusted under 35 U.S.C. 154(b) by 198 days.

(21) Appl. No.: 13/470,923

(22) Filed: May 14, 2012

(65) Prior Publication Data

US 2012/0323465 A1 Dec. 20, 2012

Related U.S. Application Data

(63) Continuation-in-part of application No. 13/163,391, filed on Jun. 17, 2011.

(51) Int. Cl.
| | |
|---|---|
| *B60T 7/12* | (2006.01) |
| *G05D 1/00* | (2006.01) |
| *G06F 7/00* | (2006.01) |
| *G06F 17/00* | (2006.01) |
| *F02D 41/00* | (2006.01) |
| *F02D 21/08* | (2006.01) |
| *F02M 25/07* | (2006.01) |

(52) U.S. Cl.
CPC ............ *F02D 21/08* (2013.01); *F02M 25/0707* (2013.01); *Y02T 10/47* (2013.01); *F02D 41/0082* (2013.01); *F02D 41/0055* (2013.01); *F02M 25/074* (2013.01); *F02M 25/0701* (2013.01); *F02M 25/0749* (2013.01); *F02M 25/0738* (2013.01); *F02M 25/0727* (2013.01); *F02D 41/0087* (2013.01)
USPC ........ 701/108; 701/103; 123/568.12; 123/676

(58) Field of Classification Search
CPC ..... F02D 21/04; F02D 21/08; F02D 41/0035; F02D 41/0025; F02D 41/0235; F02D 41/024; F02D 41/0245; F02D 41/027; F02M 25/0749
USPC ........ 701/103, 104, 108; 123/568.11, 568.12, 123/672, 676; 60/295
See application file for complete search history.

(56) References Cited

U.S. PATENT DOCUMENTS

| | | | | |
|---|---|---|---|---|
| 5,432,413 | A | * | 7/1995 | Duke et al. .................... 318/139 |
| 6,220,522 | B1 | | 4/2001 | Suzuki |

(Continued)

FOREIGN PATENT DOCUMENTS

JP 2009180100 A 8/2009

*Primary Examiner* — Erick Solis
*Assistant Examiner* — Anthony L Bacon
(74) *Attorney, Agent, or Firm* — GE Global Patent Operation; John A. Kramer

(57) ABSTRACT

Various methods and systems are provided for regenerating an exhaust gas recirculation cooler. One example method includes, initiating an EGR cooler regeneration mode, wherein the EGR cooler regeneration mode comprises changing a fuel distribution of a donor cylinder group relative to a non-donor cylinder group of an engine, and increasing at least one of engine speed or load of the engine.

18 Claims, 11 Drawing Sheets

(56) References Cited

U.S. PATENT DOCUMENTS

| | | |
|---|---|---|
| 6,367,256 B1 | 4/2002 | McKee |
| 6,425,381 B1 | 7/2002 | Rammer |
| 6,694,946 B1 | 2/2004 | Gaskins |
| 6,826,903 B2 * | 12/2004 | Yahata et al. .............. 60/278 |
| 6,904,898 B1 * | 6/2005 | Sahlen .............. 123/568.12 |
| 6,907,725 B2 | 6/2005 | Szymkowicz et al. |
| 7,043,914 B2 | 5/2006 | Ishikawa |
| 7,195,006 B2 | 3/2007 | Khair et al. |
| 7,305,976 B1 | 12/2007 | Clarke |
| 7,503,167 B2 | 3/2009 | Jankovic |
| 7,740,007 B2 * | 6/2010 | Grandas .............. 123/568.12 |
| 7,953,541 B2 | 5/2011 | Roth et al. |
| 2003/0213230 A1 | 11/2003 | Yahata et al. |
| 2006/0137665 A1 | 6/2006 | Khair et al. |
| 2007/0261400 A1 | 11/2007 | Digele et al. |
| 2008/0060624 A1 * | 3/2008 | Grandas .............. 123/568.12 |
| 2009/0056314 A1 * | 3/2009 | Gabe et al. .............. 60/278 |
| 2010/0051001 A1 * | 3/2010 | Webb et al. .............. 123/568.12 |
| 2011/0005503 A1 | 1/2011 | Harden et al. |
| 2011/0072797 A1 * | 3/2011 | Van Nieuwstadt .............. 60/285 |
| 2011/0253113 A1 * | 10/2011 | Roth et al. .............. 123/568.12 |
| 2012/0323465 A1 * | 12/2012 | Peters et al. .............. 701/104 |

* cited by examiner

METHODS AND SYSTEMS FOR EXHAUST GAS RECIRCULATION COOLER REGENERATION

CROSS REFERENCE TO RELATED APPLICATIONS

This application is a continuation-in-part of U.S. patent application Ser. No. 13/163,391 filed Jun. 17, 2011, the disclosure of which is incorporated by reference in its entirety for all purposes.

FIELD

Embodiments of the subject matter disclosed herein relate to regenerating an exhaust gas recirculation cooler in an exhaust gas recirculation system coupled to an internal combustion engine.

BACKGROUND

Engines may utilize recirculation of exhaust gas from an engine exhaust system to an engine intake system, a process referred to as exhaust gas recirculation (EGR), to reduce regulated emissions. In some examples, a group of one or more cylinders may have an exhaust manifold that is exclusively coupled to an intake passage of the engine such that the group of cylinders is dedicated, at least under some conditions, to generating exhaust gas for EGR. Such cylinders may be referred to as "donor cylinders". Further, some EGR systems may include an EGR cooler to reduce a temperature of the recirculated exhaust gas before it enters the intake passage. In such an example, fouling of the EGR cooler may occur when particulate matter (e.g., soot, hydrocarbons, oil, fuel, rust, ash, mineral deposits, and the like) in the exhaust gas accumulates within the EGR cooler, thereby decreasing effectiveness of the EGR cooler and increasing a pressure drop across the EGR cooler as well as temperature of the gas exiting the cooler, resulting in increased emissions and decreased fuel efficiency.

BRIEF DESCRIPTION

In one embodiment, an example method includes initiating an EGR cooler regeneration mode, wherein the EGR cooler regeneration mode comprises changing a fuel distribution of a donor cylinder group relative to a non-donor cylinder group of an engine, and increasing at least one of engine speed or load of the engine.

In another embodiment, a method for an engine includes, during one or more select conditions, operating the engine to generate additional engine output beyond a traction load, and dissipating excess electrical energy generated from the additional engine output to a self-load system; and routing at least a portion of engine exhaust gas through an EGR cooler positioned in an EGR system of the engine concurrent with operating the engine to generate the additional engine output. In this way, self-loading may be used to advantage to improve EGR cooler operation.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
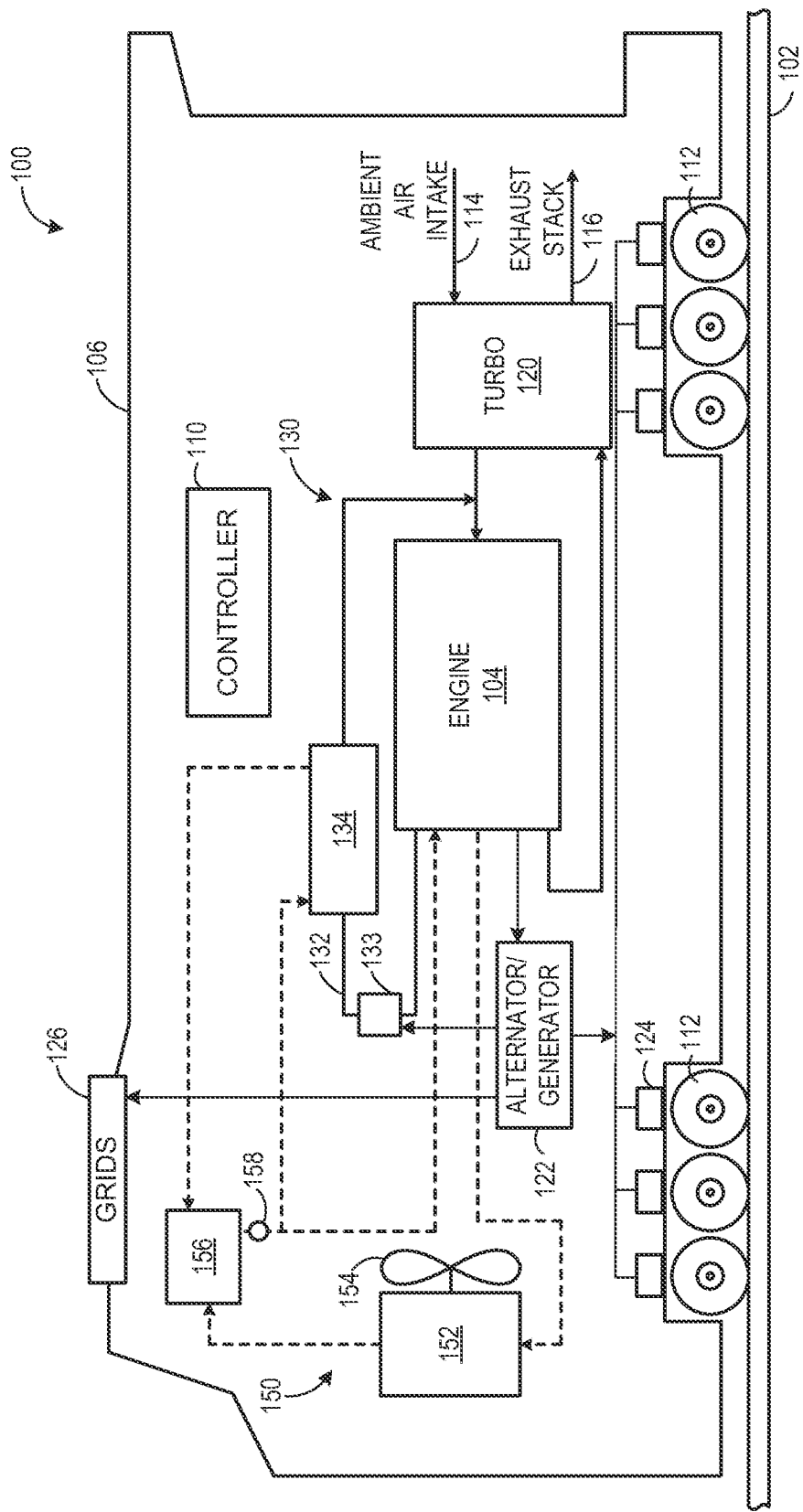
FIG. 1 shows a schematic diagram of an example embodiment of a rail vehicle with an engine according to an embodiment of the invention.

The following description relates to various embodiments of methods and systems for regenerating an exhaust gas recirculation (EGR) cooler. The EGR cooler may be part of an EGR system coupled to an engine in a vehicle, for example. One example method includes, initiating an EGR cooler regeneration mode based on an effectiveness level of the EGR cooler, wherein the EGR cooler regeneration mode includes regenerating the EGR cooler by decreasing an air-fuel ratio in at least one cylinder of a donor cylinder group of the engine by adjusting fuel distribution among the donor cylinder group and a non-donor cylinder group of the engine to increase a fuel injection quantity to the at least one cylinder of the donor cylinder group preferentially from the non-donor cylinder group, and adjusting one or more of a throttle valve position of a throttle valve of the engine and an EGR valve position of an EGR valve of the EGR system.

As used herein, donor cylinders refer to cylinders in which their exhaust is routed exclusively to the intake manifold, at least under some configurations, while non-donor cylinders refer to cylinders in which their exhaust is routed, eventually, to atmosphere. It should be appreciated that, as described herein, exhaust from donor cylinders may pass through various devices, such as an EGR cooler, before reaching the intake manifold. Likewise, exhaust from non-donor cylinders may pass through various emission control devices before reaching atmosphere.

In one example, the EGR system ay be operated in a high temperature mode. In such an example, the fuel injection quantity to each donor cylinder may be increased while preferentially reducing the fuel injection quantity to one or more of the non-donor cylinders. In this way, the donor cylinders may provide hot exhaust gas to the EGR cooler in order to remove particulates that may have accumulated within the EGR cooler such that the EGR cooler may be regenerated. Additional mechanisms may be combined with the selective fueling of the donor cylinders, such as throttling the engine, to further increase the temperature of the exhaust at the EGR cooler inlet.

In another example, the EGR system may be operated in a low temperature mode. In such an example, a fuel injection quantity to each donor cylinder may be reduced or completely cut-off while a fuel injection quantity to one or more of the non-donor cylinders is preferentially increased. In this manner, the donor cylinders may operate as an air pump to flow more intake air through the EGR cooler in order to reduce a temperature of the cooler such that particulate build-up may break off, thereby regenerating the EGR cooler.

As will be described in greater detail below, the adjusted fuel distribution among the donor cylinder and/or among the non-donor cylinder may be an even distribution or an uneven distribution. For example, while operating the donor cylinders with a greater average quantity of fuel per combustion cycle per cylinder than the non-donor cylinders, approximately the same quantity of fuel may be provided to each of the donor cylinders, or a different quantity of fuel may be provided to each of the donor cylinders. Likewise, approximately the same quantity of fuel may be provided to each of the non-donor cylinders, or a different quantity of fuel may be provided to each of the non-donor cylinders the donor cylinders.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV), and rail vehicles. For clarity of illustration, a locomotive is provided as an example mobile platform supporting a system incorporating an embodiment of the invention.

Before further discussion of the cooler regeneration approach, an example of a platform is disclosed in which the EGR system may be configured for an engine in a vehicle, such as a rail vehicle. For example, FIG. 1 shows a block diagram of an example embodiment of a vehicle system 100 (e.g., a locomotive system), herein depicted as a rail vehicle 106, configured to run on a rail 102 via a plurality of wheels 112. As depicted, the rail vehicle 106 includes an engine 104. In other non-limiting embodiments, the engine 104 may be a stationary engine, such as in a power-plant application, or an engine in a marine vessel or off-highway vehicle propulsion system as noted above.

The engine 104 receives intake air for combustion from an intake passage 114. The intake passage 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 122 and electric traction motors 124. For example, the engine 104 is a diesel engine that generates a torque output that is transmitted to the generator 122 which is mechanically coupled to the engine 104. The generator 122 produces electrical power that may be stored and applied for subsequent propagation to a variety of downstream electrical components. As an example, the generator 122 may be electrically coupled to a plurality of traction motors 124 and the generator 122 may provide electrical power o the plurality of traction motors 124. As depicted, the plurality of traction motors 124 are each connected to one of a plurality of wheels 112 to provide tractive power to propel the rail vehicle 106. One example configuration includes one traction motor per wheel. As depicted herein, six pairs of traction motors correspond to each of six pairs of wheels of the rail vehicle. In another example, alternator/generator 122 may be coupled to one or more resistive grids 126. The resistive grids 126 may be configured to dissipate excess engine torque via heat produced by the grids from electricity generated by alternator/generator 122.

The vehicle system 100 includes a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages.

In some embodiments, the vehicle system 100 may further include an aftertreatment system coupled in the exhaust passage upstream and/or downstream of the turbocharger 120. In one example embodiment, the aftertreatment system may include a diesel oxidation catalyst (DOC) and a diesel particulate filter (DPF). In other embodiments, the aftertreatment system may additionally or alternatively one or more emission control devices. Such emission control devices may include a selective catalytic reduction (SCR) catalyst, three-way catalyst, $NO_x$ trap, or various other devices or systems.

The vehicle system 100 further includes an exhaust gas recirculation (EGR) system 130 coupled to the engine 104, which routes exhaust gas from an exhaust manifold of the engine 104 to the intake passage 114 downstream of the turbocharger 120. In some embodiments, exhaust as recirculation system 130 may be coupled exclusively to a group of one or more donor cylinders of the engine. As depicted in FIG. 1, the EGR system 130 includes an EGR passage 132 and an EGR cooler 134 to reduce the temperature of the exhaust gas before it enters the intake passage 114. By introducing exhaust gas to the engine 104, the amount of available oxygen for combustion is decreased, thereby reducing the combustion flame temperatures and reducing the formation of nitrogen oxides (e.g., $NO_x$).

EGR system 130 may further include a heater 133 coupled to EGR passage 132. Heater 133 may be an electric heater that receives power from alternator 122 in response to a signal from controller 110. Thus, heater 133 may be selectively turned on in order to heat EGR entering the cooler. While heater 133 is shown coupled to EGR passage 132 upstream of the EGR cooler 134, in some embodiments heater 133 may be positioned in a different location, such as coupled to an exhaust port or the exhaust manifold of engine 104.

In some embodiments, the EGR system 130 may further include an EGR valve for controlling an amount of exhaust gas that is recirculated from the exhaust passage 116 of the engine 104 to the intake passage 114 of engine 104. The EGR valve may be an on/off valve controlled by the controller 110, or it may control a variable amount of EGR, for example. In this manner, donor cylinders may be operated as non-donor cylinders, as desired. As shown in the non-limiting example embodiment of FIG. 1, the EGR system 130 is a high-pressure EGR system. In other embodiments, the vehicle system 100 may additionally or alternatively include a low-pressure EGR system, routing EGR from downstream of the turbine to upstream of the compressor.

As depicted in FIG. 1, the vehicle system 100 further includes a cooling system 150. The cooling system 150 circulates coolant through the engine 104 to absorb waste engine heat and distribute the heated coolant to a heat exchanger, such as a radiator 152. A fan 154 may be coupled to the radiator 152 in order to maintain an airflow through the radiator 152 when the vehicle 106 is moving slowly or stopped while the engine is running. In some examples, fan speed may be controlled by a controller.

Coolant which is cooled by the radiator 152 enters a tank 156. The coolant may then be pumped by a water pump (not shown) back to the engine 104 or to another component of the vehicle system. As shown in FIG. 1, coolant may be pumped from the tank 156 to the EGR cooler 134 such that a temperature of exhaust gas flowing through the EGR cooler 134 may be reduced before it enters the intake passage 114. A temperature of the coolant may be measured by a coolant temperature sensor 158 before it enters the engine 104 or the EGR cooler 134. Coolant that passes through the EGR cooler 134 then flows back to the tank 156. In other embodiments, the EGR cooler and the radiator may have separate tanks.

Rail vehicle 106 further includes an engine controller 110 to control various components related to the rail vehicle 106. As an example, various components of the vehicle system may be coupled to the engine controller 110 via a communication channel or data bus. In one example, the engine controller 110 includes a computer control system. The engine controller 110 may additionally or alternatively include a memory holding non-transitory computer readable storage media (not shown) including code for enabling on-board monitoring and control of rail vehicle operation.

Engine controller 110 may receive information from a plurality of sensors and may send control signals to a plurality of actuators. The engine controller 110, while overseeing control and management of the rail vehicle 106, may be configured to receive signals from a variety of engine sensors, as further elaborated herein, in order to determine operating parameters and operating conditions, and correspondingly adjust various engine actuators to control operation of the rail vehicle 106. For example, the engine controller 110 may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, etc. Correspondingly, the engine controller 110 may control the rail vehicle 106 by sending commands to various components such as the traction motors 124, the alternator/generator 122, cylinder valves, fuel injectors, a notch throttle, etc. Other actuators may be coupled to various locations in the rail vehicle.

In one example, the engine controller 110 may be configured identify a temperature of coolant entering the EGR cooler, a temperature of coolant exiting the EGR cooler, a temperature of exhaust gas entering the EGR cooler, and a temperature of exhaust gas exiting the EGR cooler. The controller may utilize three of the four temperature measurements to calculate an effectiveness level of the EGR cooler, for example, as described in further detail with regard to FIG. 4.

Figure 2:
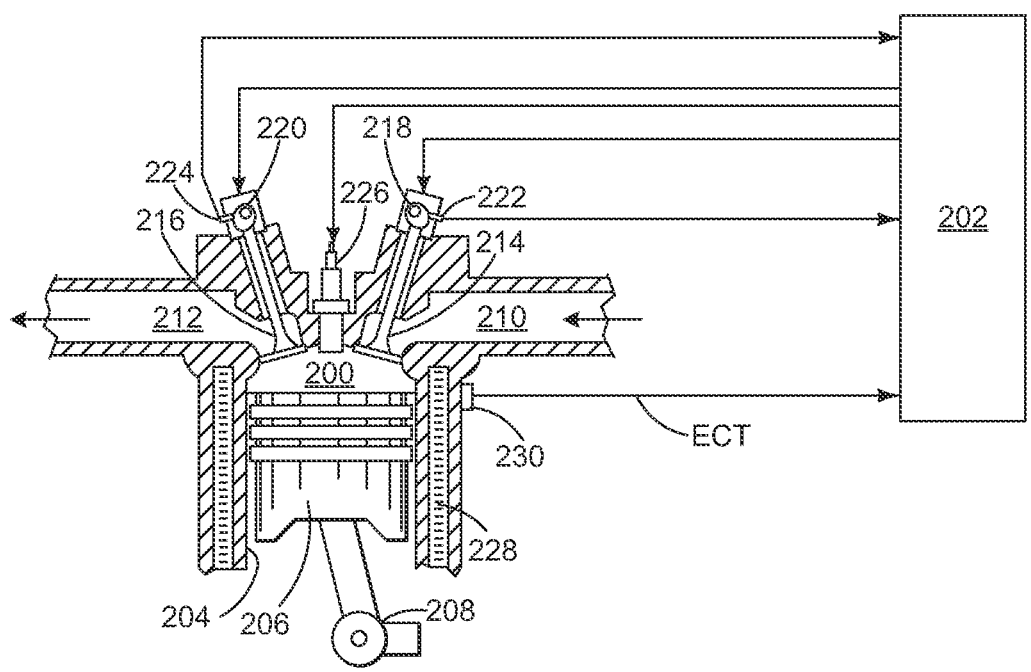
FIG. 2 shows a schematic diagram of one cylinder of an engine according to an embodiment of the invention.

FIG. 2 depicts an example embodiment of a combustion chamber, or cylinder 200, of a multi-cylinder internal combustion engine, such as the engine 104 described above with reference to FIG. 1. The engine may be controlled at least partially by a control system including controller 202 (controller 202 is one non-limiting example of engine controller 110) which may be in further communication with a vehicle system, such as the vehicle system 100 described above with reference to FIG. 1. The controller 202 may receive a signal from a notched throttle (not shown) indicating an operator's desired power output. The controller 202 may further receive signals from various engine sensors including, but not limited to, engine speed, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. Correspondingly, the controller 202 may control the vehicle system by sending commands to various components such as traction motors, alternator, cylinder valves, throttle, fuel injectors, etc.

The cylinder (i.e., combustion chamber) 200 of may include combustion chamber walls 204 with a piston 206 positioned therein. The piston 206 may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft 208. In other embodiments, the engine may be a two-stroke engine in which each of the cylinders tires in a firing order during one revolution of the crankshaft 208.

The cylinder 200 receives intake air for combustion from an intake passage 210. The intake passage 210 receives ambient air from an air filter (not shown) that filters air from outside of a vehicle in which the engine is positioned. The intake passage 210 may communicate with other cylinders of the engine in addition to the cylinder 200, for example.

Exhaust gas resulting from combustion in the engine is supplied to an exhaust passage 212. Exhaust gas flows through the exhaust passage 212 to a turbocharger (not shown in FIG. 2) and to atmosphere. The exhaust passage 212 may further receive exhaust gases from other cylinders of the engine in addition to the cylinder 200, for example.

In some embodiments, as will be described in greater detail below with reference to FIG. 3, the vehicle system may include more than one exhaust passage. For example, a donor group of cylinders may be coupled to a first exhaust manifold and a non-donor group of cylinders may be coupled to a second exhaust manifold. In this way, one of the groups of cylinders may be comprised exclusively of donor cylinders which recirculate exhaust gas to the intake passage 210 under selected operating conditions.

Continuing with FIG. 2, each cylinder of the engine may include one or more intake valves and one or more exhaust valves. For example, the cylinder 200 is shown including at least one intake poppet valve 214 and at least one exhaust poppet valve 216 located in an upper region of cylinder 200. In some embodiments, each cylinder of the engine, including cylinder 200, may include at least two intake poppet valves and at least two exhaust poppet valves located at the cylinder head.

The intake valve 214 may be controlled by the controller 202 via an actuator 218. Similarly, the exhaust valve 216 may be controlled by the controller 202 via an actuator 220. During some conditions, the controller 202 may vary the signals provided to the actuators 218 and 220 to control the opening and closing of the respective intake and exhaust valves. The position of the intake valve 214 and the exhaust valve 216 may be determined by respective valve position sensors 222 and 224, respectively. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In some embodiments, each cylinder of the engine may be configured with one or more fuel injectors for providing fuel thereto. As a non-limiting example, FIG. 2 shows the cylinder 200 is including a fuel injector 226. The fuel injector 226 is shown coupled directly to the cylinder 200 for injecting fuel directly therein. In this manner, fuel injector 226 provides what is known as direct injection of a fuel into combustion cylinder 200. The fuel may be delivered to the fuel injector 226 from a high-pressure fuel system including a fuel tank, fuel pumps, and a fuel rail (not shown). In one example, the fuel is diesel fuel that is combusted in the engine through compression ignition. In other non-limiting embodiments, the second fuel may be gasoline, kerosene, biodiesel, or other petroleum distillates of similar density through compression ignition (and/or spark ignition).

In some embodiments, the controller 202 may control a frequency and/or duration of fuel injection individually for each fuel injector 226 of the engine. For example, during differential fueling operation, a first fuel injector may be controlled to inject a higher amount of hut than a second fuel injector, which may be controlled to inject no fuel (in which case it may be referred to as skip tire operation which will be described in eater detail with reference to FIG. 3).

Figure 3:
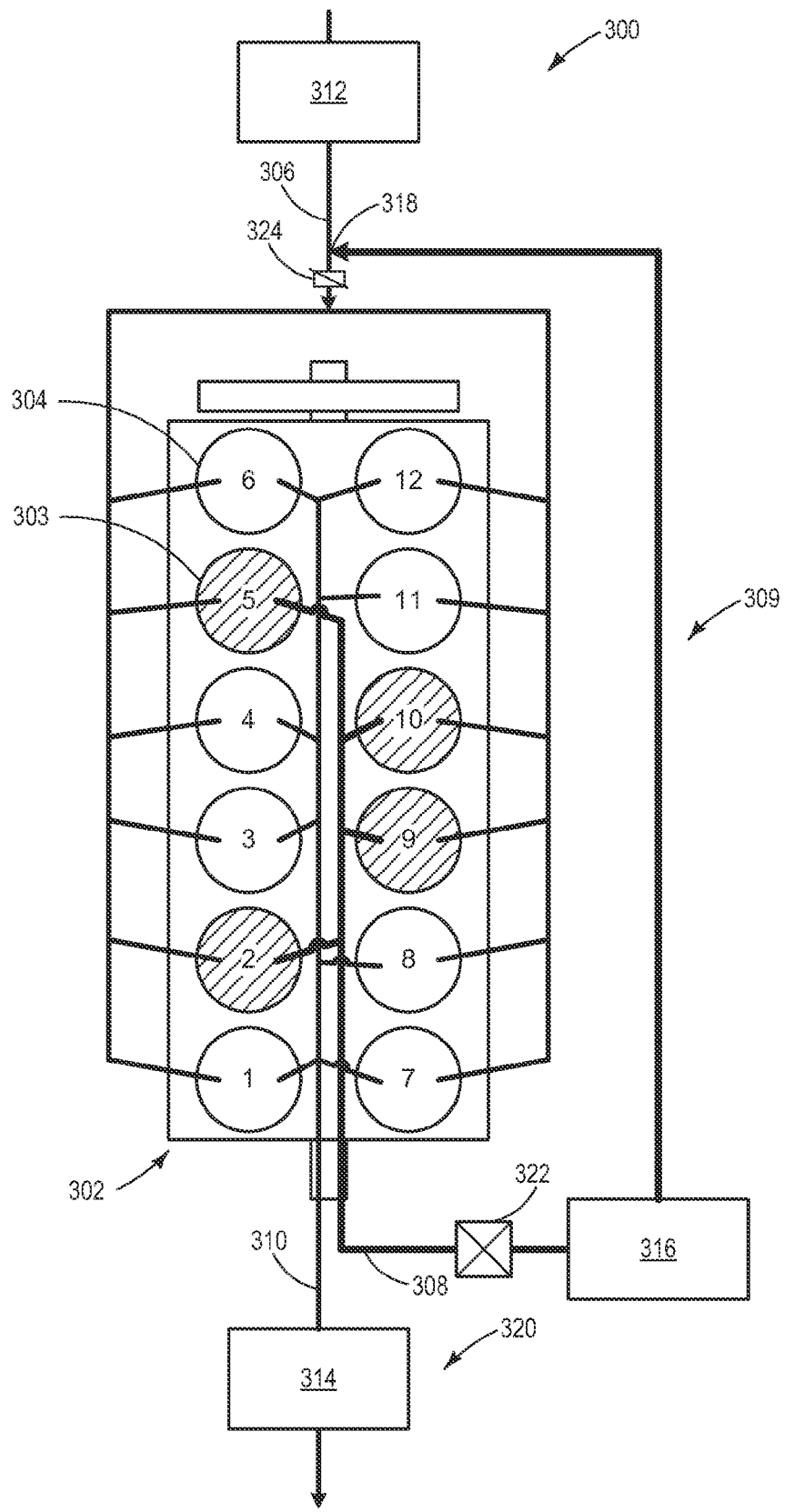
FIG. 3 shows a schematic diagram of an example embodiment of an engine with a plurality of donor cylinders and a plurality of non-donor cylinders according to an embodiment of the invention.

FIG. 3 shows an example embodiment of a system 300 with an engine 302, such as engine 104 described above with reference to FIG. 1, having a plurality of donor cylinders 303 and a plurality of non-donor cylinders 304. In the example embodiment of FIG. 3, the engine 302 is a V-12 engine having twelve cylinders. In other examples, the engine may be a V-6, V-8, V-10, V-16, I-4, I-6, I-8, opposed 4, or another engine type.

In the example embodiment of FIG. 3, the donor cylinders 303 are depicted as a first group of cylinders comprising four cylinders (e.g., cylinders labeled 2, 5, 9, and) 0 in FIG. 3). The non-donor cylinders 304 are depicted as a non-donor group of cylinders comprising eight cylinders (e.g., cylinders labeled 1, 3, 4, 6, 7, 8, 11, and 12 in FIG. 3). In other embodiments, the engine may include at least one donor cylinder and at least one non-donor cylinder. For example, the engine may have six donor cylinders and six non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 3, the donor cylinders 303 are coupled to a first exhaust manifold 308 which is part of an exhaust gas recirculation (EGR) system 309. The first exhaust manifold 308 is coupled to the exhaust ports of the donor-cylinders. As such, in the present example, the donor cylinders 303 are coupled exclusively to the first exhaust manifold 308.

Exhaust gas from each of the donor cylinders 303 is routed through the EGR system 309 to an exhaust gas inlet 318 in the intake passage 306, and not to atmosphere. Exhaust gas flowing from the donor cylinders to the intake passage 306 passes through an EGR cooler 316 to cool the exhaust gas before the exhaust gas returns to the intake passage. The EGR cooler 316 is in fluid communication with a liquid coolant or other coolant to cool the exhaust gases from the donor cylinders 303. In some embodiments, the liquid coolant may be the same coolant that flows through the cooling sleeve surrounding each cylinder, such as cooling sleeve 228 depicted in FIG. 2, for example. The exhaust gas flowing from the donor cylinders may be controlled via an EGR valve 322.

In the example embodiment illustrated in FIG. 3, the non-donor cylinders 304 are coupled to a second exhaust manifold 310. The second exhaust manifold 310 is coupled to the exhaust ports of at least the non-donor-cylinders, but, in some examples, may be coupled to exhaust ports of the donor cylinders. For example, exhaust gas from one or more of the donor cylinders may be directed to the second exhaust manifold 310 via a control element, such as a valve, such that an amount of EGR may be reduced as desired, for example. In the present example, the non-donor cylinders 304 are coupled exclusively to the second exhaust manifold 310. Exhaust gas from the non-donor cylinders 304 flows to an exhaust system 320, and then to atmosphere. The exhaust system may include exhaust gas treatment devices, elements, and components, for example, a diesel oxidation catalyst, a particulate matter trap, hydrocarbon trap, an SCR catalyst, etc., as described above. Further, in the present example, exhaust gas from the non-donor cylinders 304 drives a turbine 314 of a turbocharger.

Some embodiments may include a communication passage between the first exhaust manifold 308 and the second exhaust manifold 310. In some examples, the communication may include a valve (e.g., an additional EGR valve), and the controller may operate the valve to control communication the donor cylinders and the non-donor cylinders. In such an example, exhaust gas flow from the donor cylinders may be routed to atmosphere instead of to the intake passage or exhaust gas flow from the non-donor cylinders may be routed to the intake passage.

In embodiments in which the engine is a V-engine, the exhaust manifolds 308 and 310 may be inboard exhaust manifolds. For example, the exhaust ports of each of the cylinders are lined up on the inside of the V-shape. In other embodiments, the exhaust manifolds 308 and 310 may be outboard exhaust manifolds. For example, the exhaust ports of each of the cylinders are lined up on the outside of the V-shape.

As depicted in FIG. 3, the engine 302 is configured with a turbocharger including the exhaust turbine 314 arranged along the second exhaust manifold 310, and a compressor 312 arranged in the intake passage 306. The compressor 312 may be at least partially powered by the exhaust turbine 314 via a shaft (not shown). As shown in FIG. 3, the exhaust gas inlet 318 is downstream of the compressor 312 in the intake passage 306. Further, in some embodiments, the intake passage 306 may include an intake throttle valve 324. Under certain conditions, the throttle valve 324 may be adjusted to lower overall engine airflow in order to reduce system air-fuel ratio and increase exhaust temperatures.

In a V-12 engine, such as depicted in FIG. 3, the engine may have a cylinder firing order such as 1-7-5-11-3-9-6-12-2-8-4-10, for example, in which cylinder 1 fires first, cylinder 7 fires second, cylinder 5 fires third, and so on. In other examples, the cylinders may have a different firing order. During normal, non-skip fire conditions, each cylinder is fired once every engine cycle, or once every 720 crankshaft degrees, according to the cylinder firing order. In the embodiment depicted in FIG. 2, the engine 202 comprises four donor cylinders, and thus in non-skip fire conditions, four out of twelve fired cylinders are donor cylinders. As a result, approximately 33% of the gasses inducted into the cylinders may derive from the donor cylinders.

During non-preferential skip fire conditions, the donor cylinders may be fired in the same proportion as non-skip tire conditions, for example if half of the cylinders are skipped for the example of FIG. 3, then two of the four donor cylinders may be skipped and 4 of the 8 non-donor cylinders may be skipped thus maintaining the same effective EGR rate. During preferential skip fire conditions, the donor cylinders may comprise a different proportion of the fired cylinders. For example, during a preferential skip fire routine wherein the donor cylinders are preferentially fired, the donor cylinders may comprise four out of nine fired cylinders, or four out of six fired cylinders, two out of ten fired cylinders, or in some embodiments, the non-donor cylinders may be the only cylinders fired. Any proportion of donor cylinders fired is within the scope of this disclosure. The proportion of donor cylinders fired may be selected based upon a desired temperature of exhaust gas from the donor cylinders. For example, when a donor cylinder is skip fired, ambient intake air may be exhausted from the cylinder instead of combustion products and the ambient intake air may have a lower temperature than the combusted gases.

In this manner, the engine may be operated to provide heating or cooling to the EGR cooler such that regeneration may occur while maintaining engine output. In a low temperature mode, as described below with reference to FIGS. 5 and 6, one or more donor cylinders may be skipped such that the temperature of the exhaust flow from the donor cylinders decreases. The lower temperature exhaust flow which passes through the EGR cooler may reduce the temperature of the EGR cooler such that the EGR cooler may be regenerated a low temperature. In a high temperature mode, as described below with reference to FIGS. 8 and 9, one or more non-donor cylinders may be skipped and a fuel injection quantity to the donor cylinders is correspondingly increased such that the temperature of the exhaust flow from the donor cylinders increases. The high temperature exhaust flow which passes through the EGR cooler may increase the temperature of the EGR cooler such that the EGR cooler may be regenerated at a high temperature.

In one embodiment, a method for regenerating an EGR cooler of an EGR system coupled to an engine, the engine including a plurality of donor cylinders and a plurality of non-donor cylinders, such as the EGR system 309 coupled to the engine 302 described above with reference to FIG. 3, includes, during a low temperature mode, decreasing a fuel injection quantity to one or more donor cylinders preferentially and transferring additional fueling to one or more the non-donor cylinders. The method further includes, during a high temperature mode, increasing a fuel injection quantity to the donor cylinders preferentially from the non-donor cylinders. In this way, the donor cylinders combust a greater amount of fuel per cylinder, on average, than the non-donor cylinders thus increasing exhaust temperature of the donor cylinder. Therefore, it is possible to regulate the EGR cooler temperature to a desired temperature, such as a desired regeneration temperature, while still maintaining engine output by appropriate selection of the fueling levels among the cylinder groups.

Figure 4:
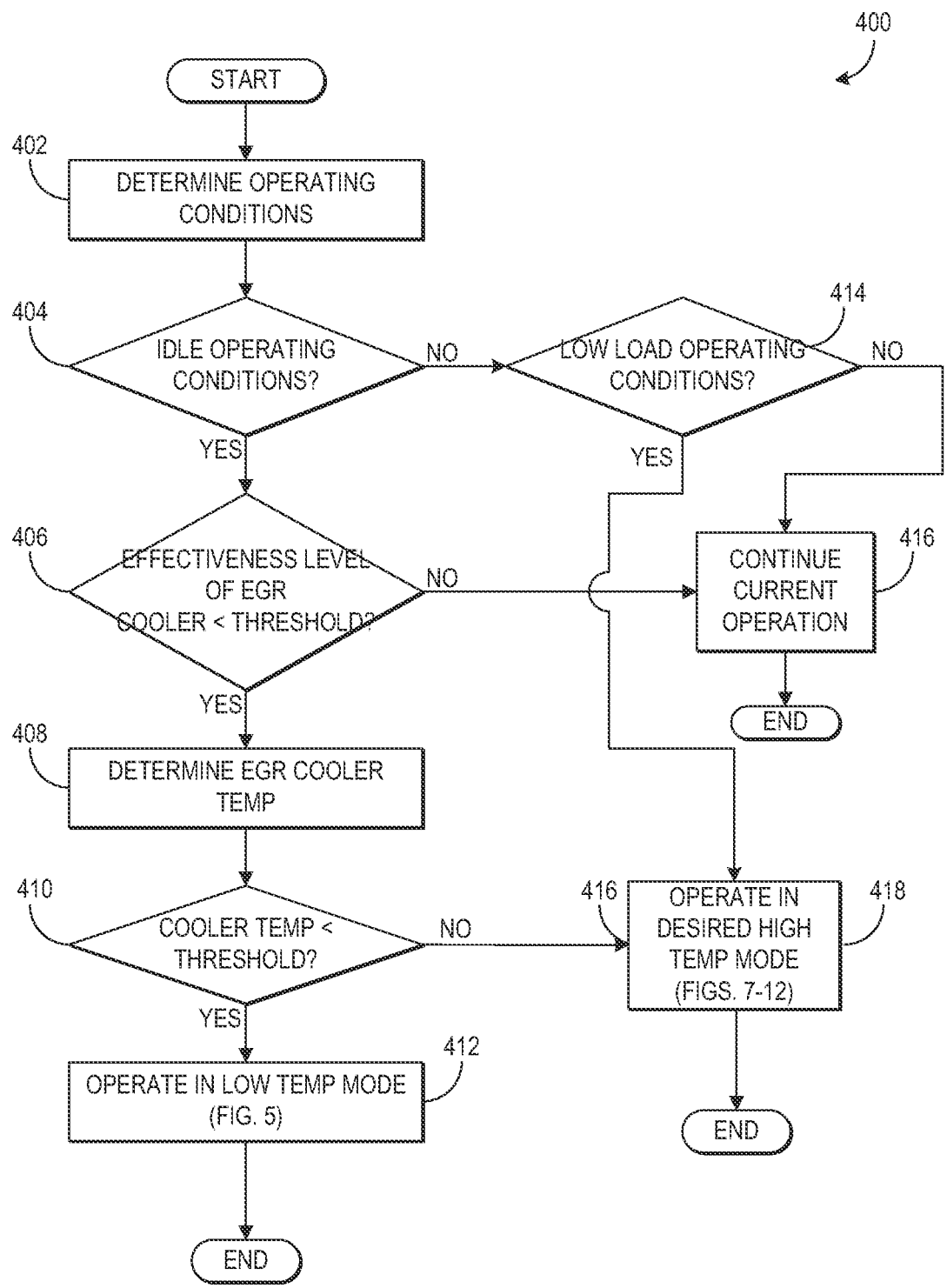
FIG. 4 shows a flow chart illustrating a method for an exhaust gas recirculation system, which includes an exhaust gas recirculation cooler, coupled to an engine.
Figure 5:
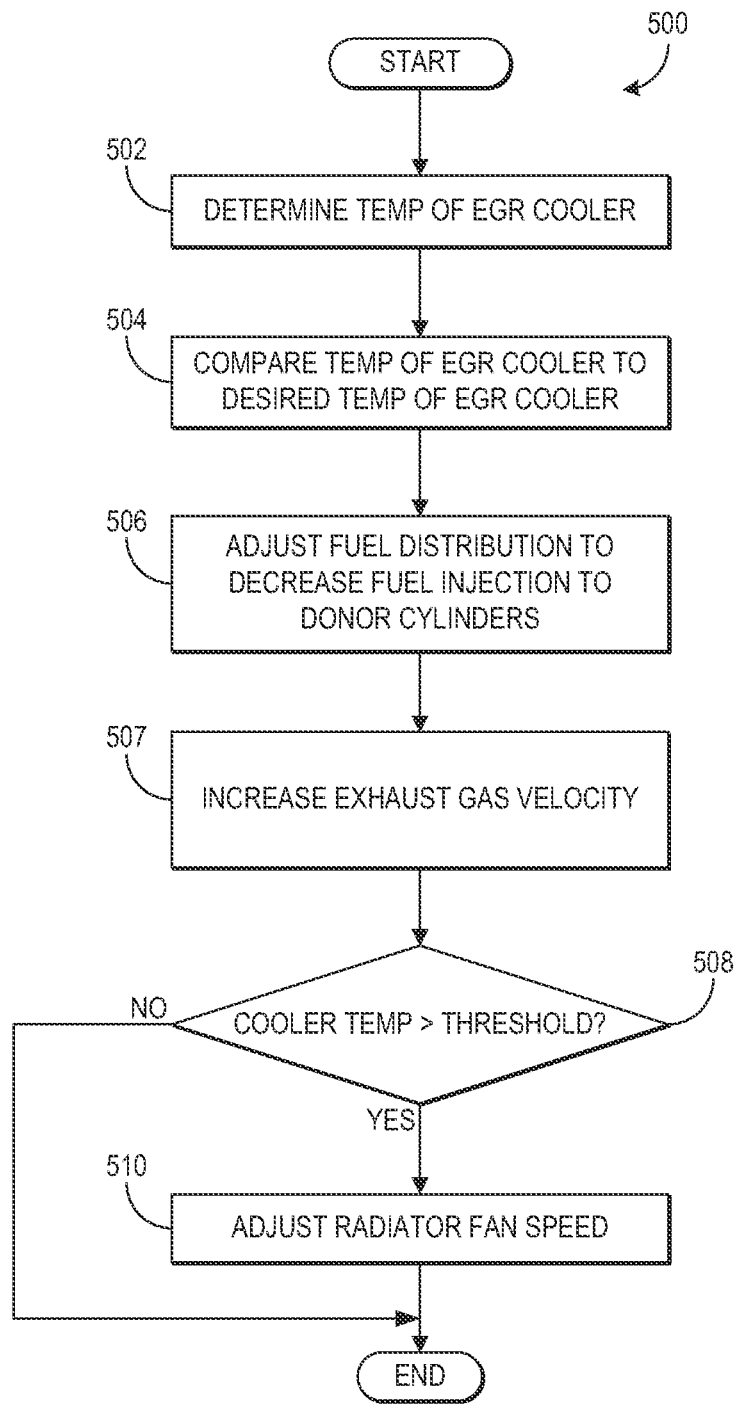
FIG. 5 shows a flow chart illustrating a method for regenerating an exhaust gas recirculation cooler in a low temperature mode.
Figure 6:
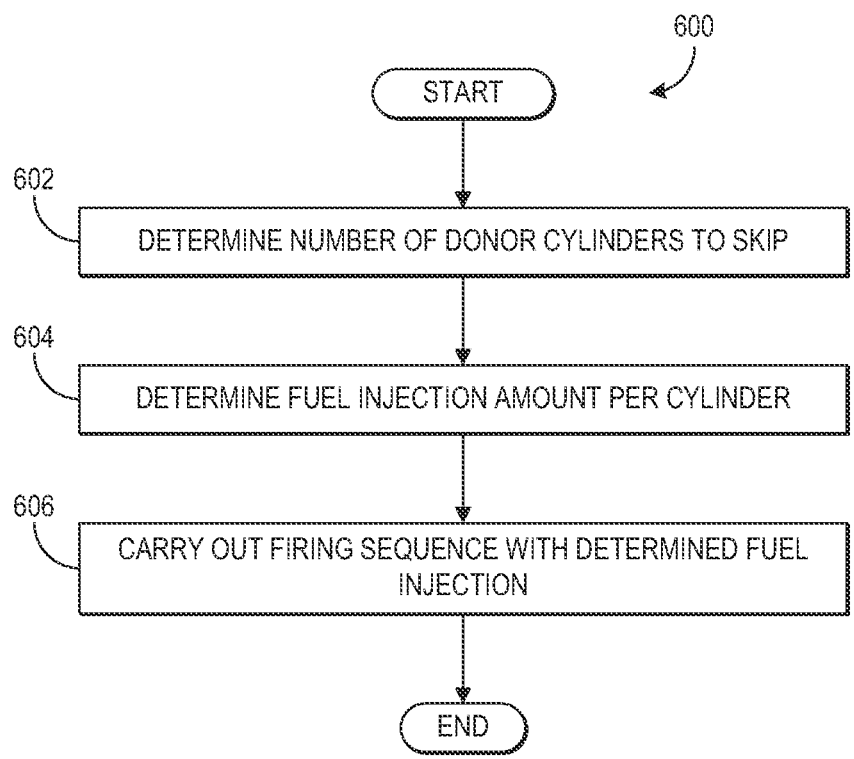
FIG. 6 shows a flow chart illustrating a method for adjusting fuel distribution in a low temperature mode.
Figure 7:
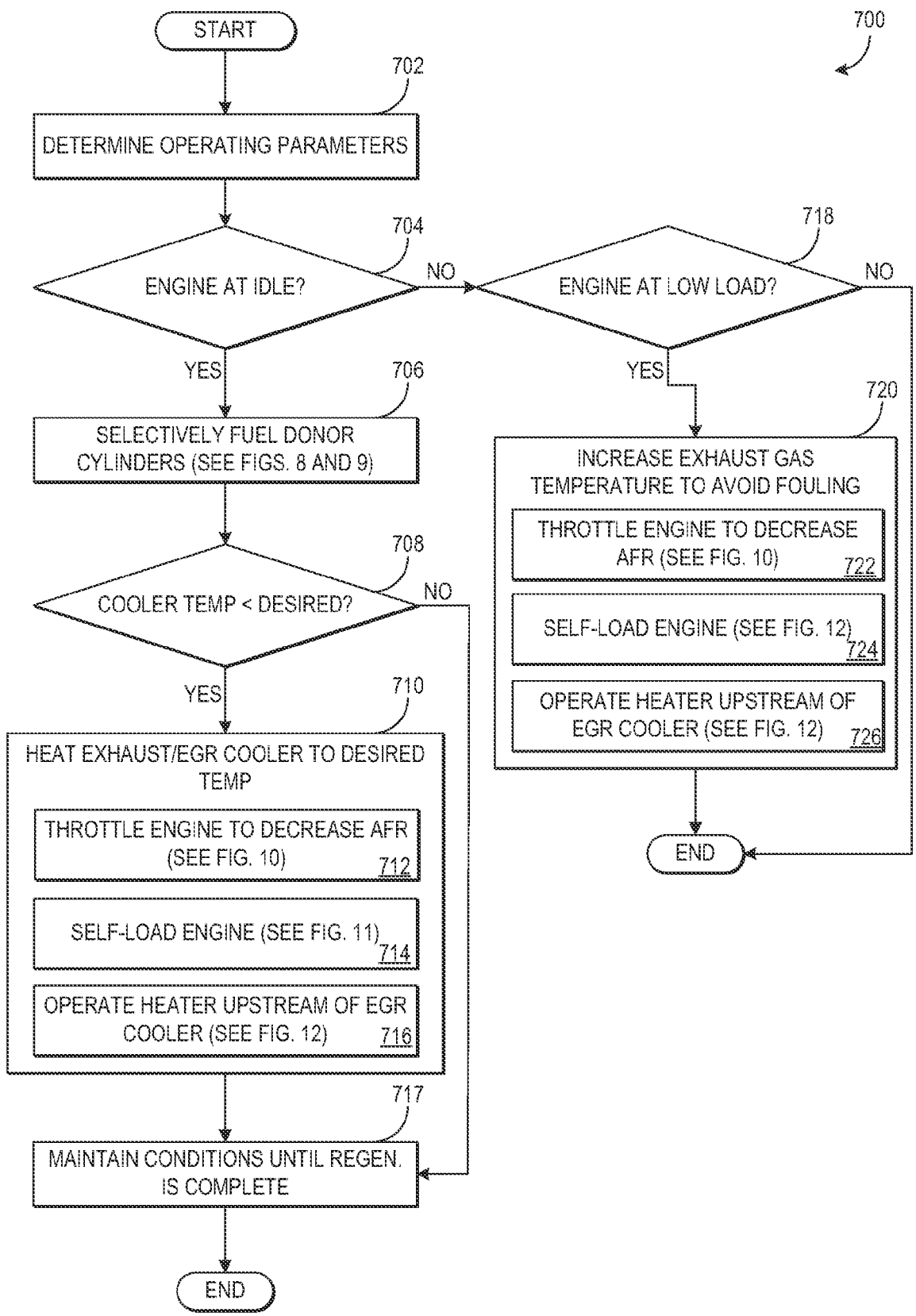
FIG. 7 shows a flow chart illustrating a method for determining a regeneration mechanism for regenerating an exhaust gas recirculation cooler in a high temperature mode.
Figure 8:
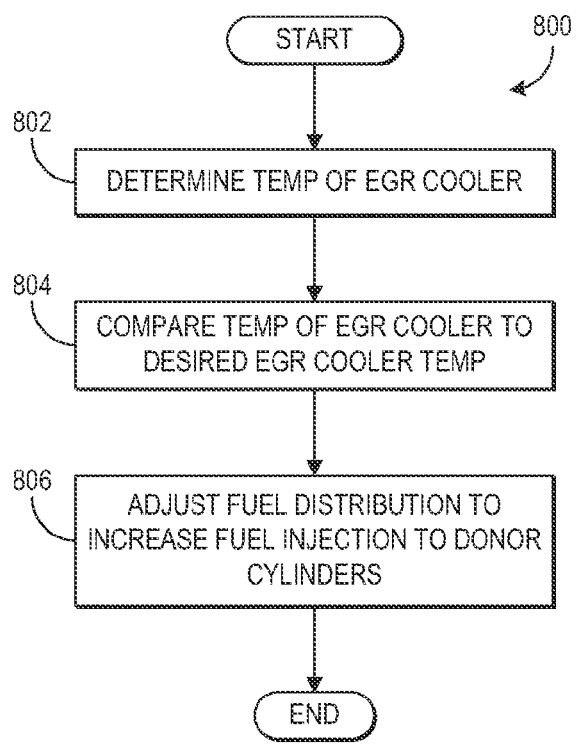
FIG. 8 shows a flow chart illustrating a method for regenerating an exhaust gas recirculation cooler in a high temperature mode.
Figure 9:
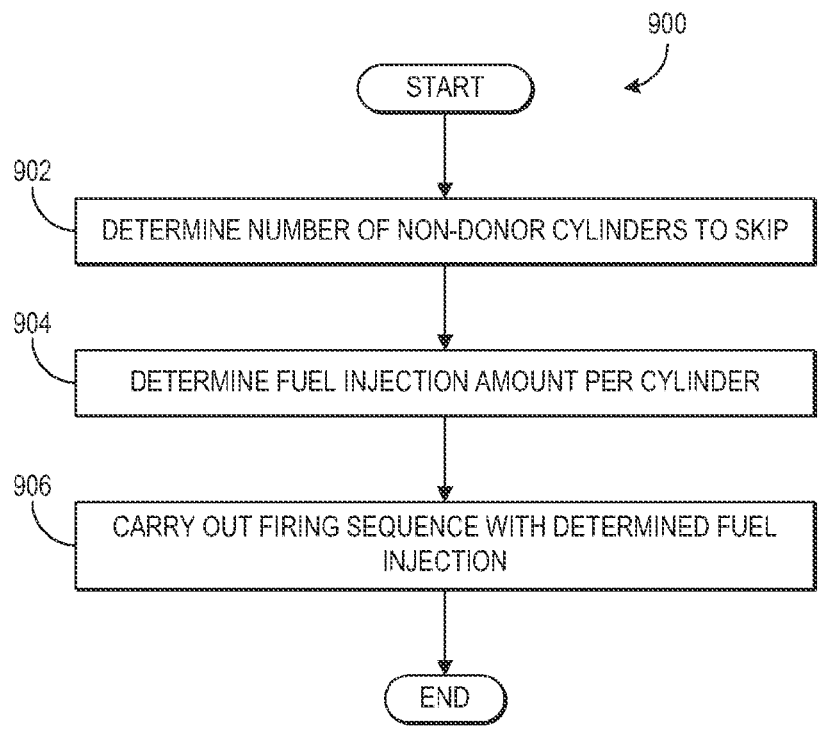
FIG. 9 shows a flow chart illustrating a method for adjusting fuel distribution in a high temperature mode.
Figure 10:
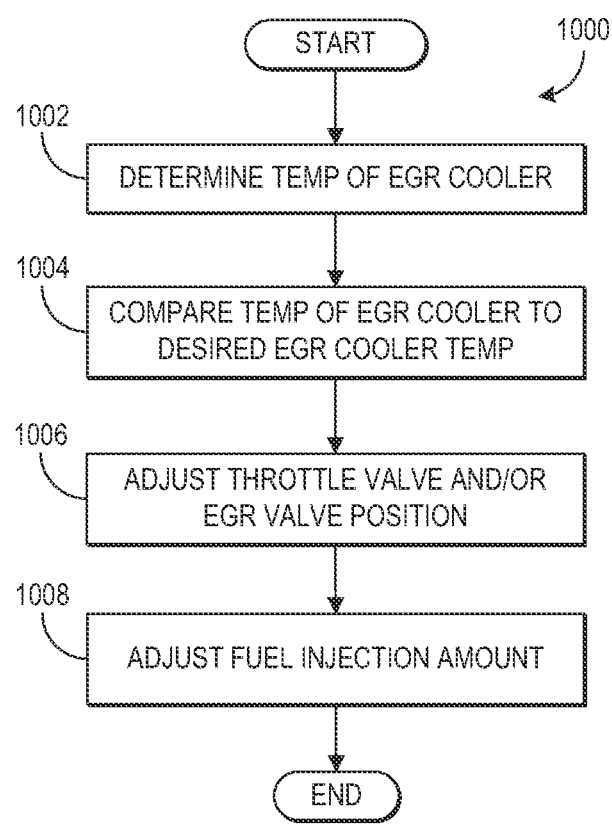
FIGS. 10-12 show flow charts illustrating methods for increasing exhaust temperature.
Figure 11:
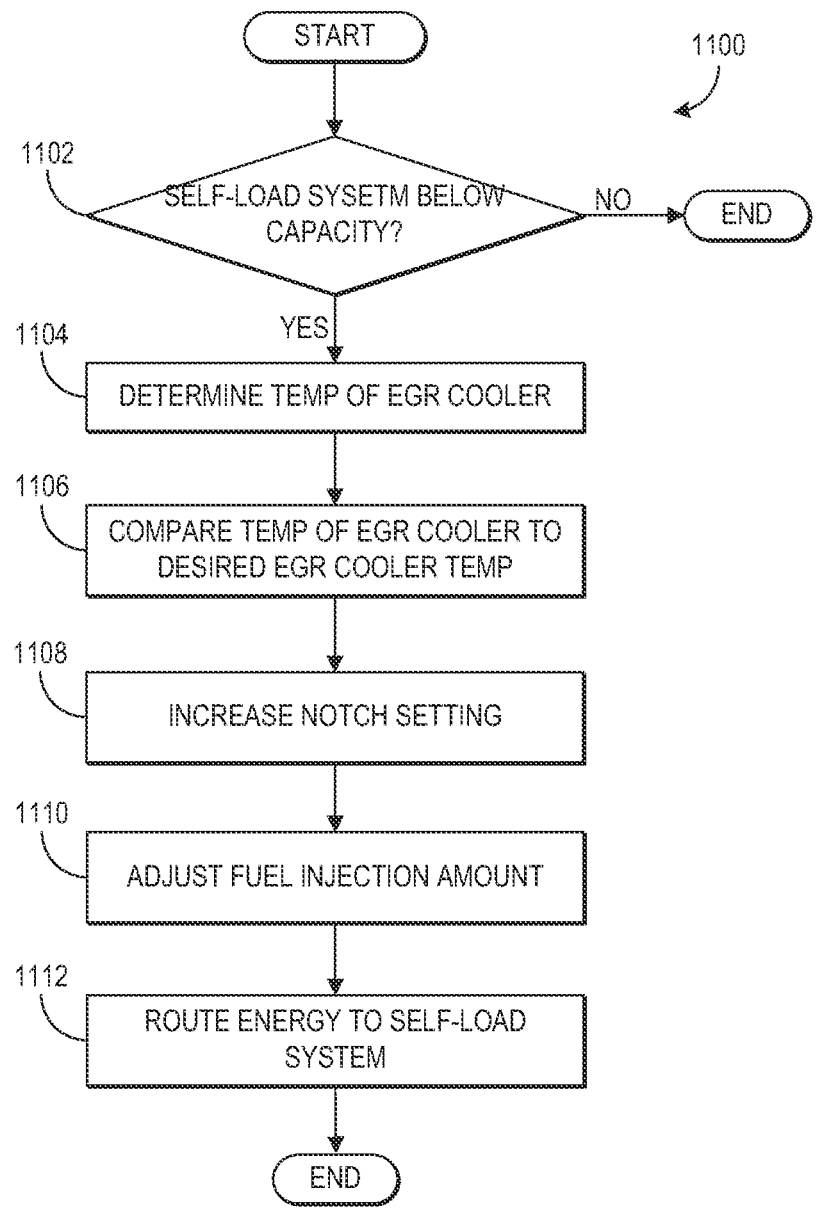
Figure 12:
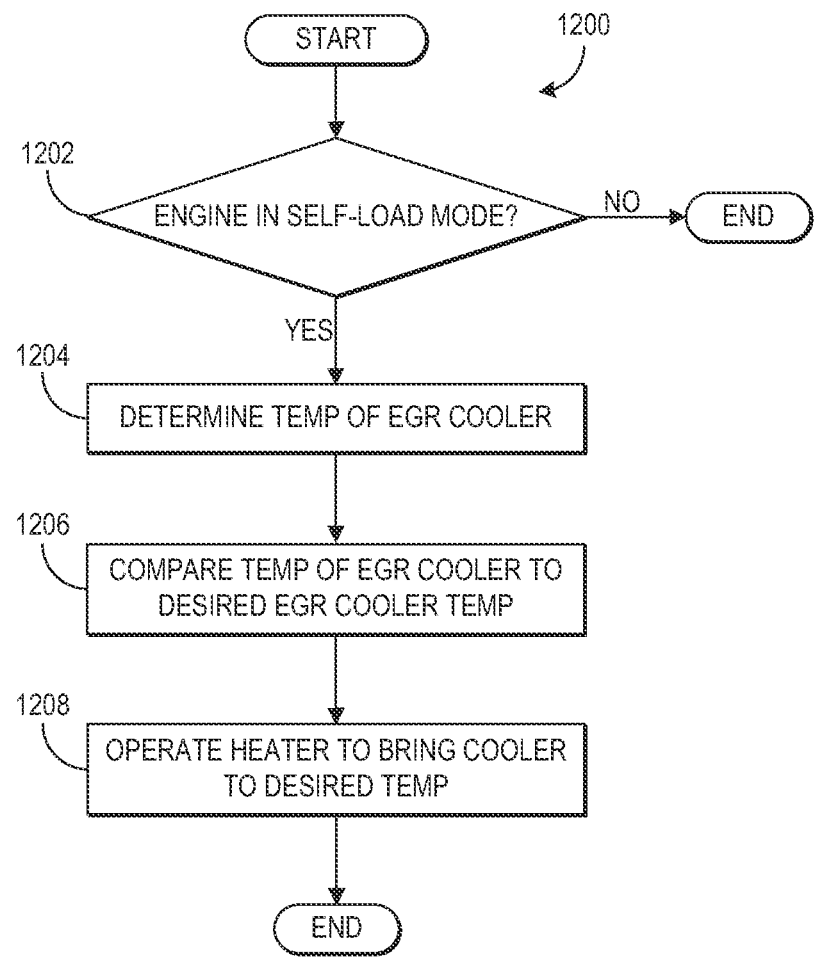

Referring now to FIGS. 4-12, methods for an EGR system, which includes an EGR cooler, coupled to an engine are described. FIG. 4 illustrates a method of determining if regeneration of the EGR cooler is desired based on an effectiveness level of the EGR cooler. The method shown in FIG. 4 further determines if the regeneration should be carried out in a low temperature regeneration mode or in a high temperature regeneration mode. FIGS. 5 and 6 illustrate the low temperature mode of operation and adjustment of fuel distribution across the cylinders, respectively. FIG. 7 determines which combination of a plurality of mechanisms for heating the exhaust gas and cooler should be carried out. FIGS. 8 and 9 illustrate the high temperature mode of operation and adjustment of fuel distribution across the cylinders, respectively. FIGS. 10-12 illustrate additional high temperature modes of operation.

FIG. 4 shows a flow chart illustrating a method 400 for an EGR system including an EGR cooler coupled to an engine, such as the EGR system 309 coupled to the engine 302 described above with reference to FIG. 3. Specifically, the method determines if regeneration of the EGR cooler is requested based on an effectiveness level of the EGR cooler. In addition, the method determines if proactive measures may be taken during certain operating conditions to prevent fouling of the EGR cooler.

At 402, operating conditions are determined. The operating conditions may include engine load, ambient temperature, exhaust gas temperature, engine coolant temperature, and the like.

At 404, it is determined if the engine is under idle operating conditions. In some examples, a portion of a rail vehicle duty cycle may be idle time (e.g., at least 50%). During idle conditions, an EGR rate may be low as compared to loaded engine conditions. As such, the EGR cooler may be regenerated during idle conditions, as a low temperature mode of regeneration may substantially reduce the EGR rate, as will be described below.

If it is determined that the engine is not under idle operating conditions, the method moves to 414 to determine if the engine is operating under low load conditions, which will be explained in more detail below. If it is determined that the engine is under idle operating conditions, it is determined if the effectiveness level of the EGR cooler is greater than a threshold at 406. For example, the effectiveness level of the EGR cooler is a ratio of heat transfer which may be calculated using temperature values of three of the following: exhaust gas in, exhaust gas out, coolant in, and coolant out. An EGR cooler that is fouled due to build-up of particulates from the exhaust gas may have a low effectiveness level, for example, as exhaust gas may be not effectively cooled. If it is determined that the effectiveness level is greater than a threshold value, current operation is continued at 416 and the method ends.

On the other hand, if it is determined that the effectiveness level is less than the threshold value, and regeneration of the EGR cooler is desired, the method continues to 408 where a core temperature of the EGR cooler the temperature of the EGR cooler) is determined. At 410, it is determined if the temperature of the EGR cooler is less than a threshold temperature. As an example, the threshold temperature may be a median temperature, above which the temperature of the EGR cooler may be more easily increased, and below which the EGR cooler temperature may be more easily decreased. Thus, if the temperature of the EGR cooler exceeds the threshold temperature, the system is operated in a high temperature mode at 418, as will be described in greater detail below with reference to FIGS. 7-12. On the other hand, if the temperature of the EGR cooler is less than the threshold temperature, the system is operated in a low temperature mode at 412, as will be described in greater detail below with reference to FIGS. 5 and 6.

Returning to 414, method 400 includes determining if the engine is operating under low load conditions. Low load conditions may be determined based on a setting of the notch throttle controlling engine load. For example, a notch setting of 3 or below may be considered low load. However, other mechanisms for determining low load operation are possible. If the engine is not operating under low load conditions, method 400 proceeds to 416 to continue current operation. On the other hand, if the engine is under low load conditions, the rail vehicle may be operated in the high temperature mode at 418. Rail vehicles frequently undergo low load excursions, where exhaust gas temperatures can drop. The relatively lower exhaust gas temperatures may prevent vaporization of lubrication oil present in the exhaust, which may contribute to EGR cooler fouling. Further, the low exhaust gas temperatures may also result in condensation in the EGR cooler, further degrading cooler performance. Thus, operating in the high temperature mode, as explained in more detail below, may provide for heating the exhaust gas to prevent EGR cooler degradation. Upon operating in a desired high temperature mode, method 400 ends.

FIG. 5 shows a flow chart illustrating a method for regenerating an EGR cooler in a low temperature mode. Specifically, the method determines a temperature of the EGR cooler and adjusts fuel distribution among the donor cylinders and non-donor cylinders based on a desired temperature of the EGR cooler.

At 502, the temperature of the EGR cooler is determined. As described above, the temperature of the EGR cooler may be a core temperature of the EGR cooler. At 504, the temperature of the EGR cooler is compared to a desired temperature of the EGR cooler to determine a difference between the current temperature of the EGR cooler and the desired temperature of the EGR cooler. During the low temperature mode, the desired temperature of the EGR cooler may be a relatively low temperature (e.g., a temperature lower than in a high temperature regeneration mode). In one example, the desired temperature may be less than 50° C., and more specifically, in a range of 40-50° C. At the low temperature, particulate matter that has built up in the EGR cooler such as soot may hydrolyze such that it can break off due to the force of the airflow through the EGR cooler. In some examples, the low temperature may result in formation of condensate, which may regenerate the EGR cooler by washing the particulate build-up from the EGR cooler.

At 506, fuel distribution is adjusted to decrease a fuel injection quantity from the donor cylinders preferentially from the non-donor cylinders based on the actual and desired EGR cooler temperatures according to the method 600 illustrated in FIG. 6. At 602, a number of donor cylinders to skip is determined. The number of donor cylinders to skip may be determined based on the desired temperature of exhaust gas from the donor cylinders. For example, if the difference between the desired EGR cooler temperature and the EGR cooler temperature determined at 504 is relatively large, one or more donor cylinders may be skipped in order to decrease the temperature of the donor cylinder exhaust gas, thereby decreasing the tempera u e of the EGR cooler. On the other hand, if the difference between the desired temperature of the EGR cooler and the current temperature is relatively small, it may be determined that no donor cylinders should be skip fired (e.g., all cylinder firing with differential fueling between the donor and non-donor cylinders).

At 604, a fuel injection amount, or quantity, per cylinder is determined. The fuel injection amount per cylinder may be based on fuel demand, desired temperature of the donor cylinder exhaust gas, and the number of donor cylinders that are skipped (as determined at 602). The fuel injection amount to the donor cylinders may be based on the desired temperature of the donor cylinder exhaust gas. As an example, a fuel injection quantity to one or more of the donor cylinders may be decreased in order to reduce the donor cylinder exhaust gas temperature such that the temperature of the EGR cooler may be reduced. The fuel injection quantity to the non-donor cylinders may be increased in proportion to the reduced fuel distribution to the donor cylinders. For example, if the fuel injection quantity is decreased by 20% in each of the donor cylinders (e.g., four donor cylinders in the example depicted in FIG. 3), the fuel injection quantity may be increased by 80% across the non-donor cylinders (e.g., each non-donor cylinder receives a 10% fuel increase, four non-donor cylinders receive a 20% fuel increase, etc.). In some examples, a fuel injection quantity to the non-donor cylinders may be increased such there is an even fuel distribution across the non-donor cylinders. In other examples, a fuel injection quantity to the non-donor cylinders may be increased such that there is an uneven fuel distribution across the non-donor cylinders. The amount of fuel injected to each cylinder may be based on air fuel ratio constraints, for example. The cylinders may have minimum and maximum air fuel ratio constraints based on the engine operating conditions. A fuel injection amount which results in an air fuel ratio that is too high or low may result in engine misfire, increased emissions, torque imbalance, and the like, and thus the selection of the fuel increase and decrease for each respective cylinder may be constrained in this way.

As another example, fuel injection to one or more of the donor cylinders may be stopped while a fuel injection quantity to remaining donor cylinders may be decreased in order to reduce the donor cylinder exhaust gas temperature such that the temperature of the EGR cooler may be reduced. The fuel injection quantity to the non-donor cylinders may be increased in proportion to the reduced fuel distribution to the donor cylinders (taking into account the complete reduction in injected fuel to skipped donor cylinders). For example, if the fuel injection quantity is decreased by 20% in each of two donor cylinders and two donor cylinders are skip fired (e.g., four donor cylinders in the example depicted in FIG. 3), the fuel injection quantity may be increased by 40% across the non-donor cylinders (e.g., each non-donor cylinder receives a 5% fuel increase, four non-donor cylinders receive a 10% fuel increase, etc.). As noted above, in some examples, the fuel injection quantity to the non-donor cylinders may be increased such there is an even fuel distribution across the non-donor cylinders, or the fuel injection quantity to the non-donor cylinders may be increased such that there is an uneven fuel distribution across the non-donor cylinders.

At 606, a firing sequence is carried out with the determined fuel injection the quantity to each of the cylinders. In one example, fuel injection to a subset of the donor cylinder may be cut-off and the fuel injection quantity to the other donor cylinders is reduced, while the fuel injection quantity to one or more of the non-donor cylinders is increased such that a torque generated by the engine is maintained. In another example, the fuel injection quantity may be reduced by a same or different amount in each of the donor cylinders, and the fuel injection quantity to one or more of the non-donor cylinders is increased. In yet another example, fuel injection may be cut-off to every donor cylinder, while the fuel injection quantity to a subset or each of the non-donor cylinders is increased. In such an example, the exhaust gas routed though the EGR cooler to the intake passage may be comprised of only cooled intake air, as fuel is not injected to the donor cylinder and combustion does not occur in the donor cylinders.

In some embodiments, the fuel injection quantity to each cylinder may vary between engine cycles such that cylinder firing is balanced across engine cycles. As a non-limiting example, if non-donor cylinders 1, 8, 4, and 11 receive a 10% increase of the fuel injection quantity and non-donor cylinders 7, 3, 6, and 12 receive a 0% increase of the fuel injection quantity during a first engine cycle such that the fuel injection quantity is reduced by 40% across the donor cylinders, non-donor cylinders 7, 3, 6, and 12 may receive a 10% increase of the fuel injection quantity while non-donor cylinders 1, 8, 4, and 11 receive a 0% increase of the fuel injection quantity during the subsequent engine cycle, while the donor cylinders still have the fuel injection quantity that is reduced by 40%.

Continuing with method 500 shown in FIG. 5, at 507, exhaust gas velocity may be increased. In some examples, the engine speed may be increased such that a velocity of the exhaust gas passing through the EGR cooler is increased to aid in cooler regeneration. As such, when a temperature of the exhaust gas is low (e.g., when the fuel injection quantity is reduced and/or cut-off in the donor cylinders), the EGR cooler may be cooled such that regeneration may be initiated more rapidly. Increasing the engine speed may be desirable, for example, when switching from the high temperature mode to the low temperature mode of operation.

At 508, it is determined if the EGR cooler temperature is greater than a threshold temperature. The threshold temperature may be the desired temperature, for example, or a temperature that is within a range of the desired temperature. If the EGR cooler temperature is less than the desired temperature, the method ends. If the EGR cooler temperature is greater than the desired temperature, regeneration may not occur as desired, and the method continues to 510 where a speed of one or more radiator fans is adjusted. By adjusting the radiator fan speed, a temperature of the engine coolant may be further reduced as it passes through the radiator. For example, if the temperature is still too high even if all donor cylinders are skip fired, the temperature of the coolant passing through the EGR cooler may be lower resulting in increased cooling of the EGR cooler and thus a lower temperature may be obtained to regenerate the cooler. Further, in some examples, coolant flow rate of coolant supplied to the EGR cooler may be increased in order to increase cooling of the EGR cooler.

Thus, during the low temperature mode of regenerating the EGR cooler, the fuel injection quantity may be adjusted such that fuel to one or more donor cylinders is reduced and/or skipping of one or more of the donor cylinders occurs during an engine cycle. In this manner, a temperature of the exhaust gas exiting the donor cylinders may be decreased such that a temperature of the EGR cooler may be decreased in order to facilitate regeneration of the EGR cooler at low temperature.

FIG. 7 shows a flow chart illustrating a method for determining which of a plurality of mechanisms are carried out during high temperature mode. Depending on operating conditions and EGR cooler temperature, one or a combination of a plurality of mechanisms to heat the exhaust and EGR cooler may be employed. At 702 of method 700, operating parameters are determined. The operating parameters may include engine speed, engine load, EGR cooler temperature, etc. At 704, it is determined if the engine is operating at idle. If yes, method 700 proceeds to 706 to selectively fuel the donor cylinders in order to increase exhaust gas temperature. Selectively fueling the donor cylinders will be described below with respect to FIGS. 8 and 9.

Upon selectively fueling the donor cylinders, method 700 determines, at 708, if the EGR cooler temperature is below a desired temperature. The desired temperature may be a temperature at or above which effective EGR cooler regeneration occurs. If the cooler is at or above the desired temperature, method 700 proceeds to 717 to maintain current conditions until the regeneration is complete. If the cooler temperature is not at the desired temperature, method 700 proceeds to 710 to the exhaust and EGR cooler to the desired temperature using one or more additional heating mechanisms. The additional heating mechanisms include throttling the engine to decrease air-fuel ratio at 712, self-loading the engine at 714, and operating a heater upstream of the EGR cooler at 716. Each of the above listed mechanisms may heat the exhaust above the temperature provided by the selective fueling to effectively and quickly regenerate the cooler. Further, in some embodiments, the throttling, self-loading, and heater operation may be performed only in combination with selective fueling during idle conditions. In other embodiments, the throttling, self-loading, and heater operation may be performed at idle to regenerate the cooler without the selective fueling. Additionally, depending on operating conditions and the degree to which the EGR cooler is to be heated, one or more of the mechanisms may be carried out. The throttling, self-loading, and heater operation will be described below with respect to FIGS. 10-12. Upon selecting additional heating mechanisms, method 700 proceeds to maintain the selected operating conditions until the regeneration is complete at 717, and then method 700 ends.

Returning to 704 of FIG. 7, if it is determined that the engine is not operating under idle conditions, method 700 proceeds to 718 to determine if the engine is at low load. If the engine is not at low load, method 700 ends. If the engine is under low load, method 700 proceeds to 720 to increase the exhaust gas temperature to avoid fouling the EGR cooler. Similar to heating the cooler during regeneration at idle, the exhaust gas may be heated proactively at low load by throttling the engine at 722, self-loading the engine at 724, and/or operating the heater upstream of the cooler at 726, to prevent EGR cooler fouling. The throttling, self-loading, and heater operation will be described below with respect to FIGS. 10-12. Upon heating the exhaust gas, method 700 ends.

FIG. 8 shows a flow chart illustrating a method for regenerating an EGR cooler in a high temperature mode. Specifically, the method determines a temperature of the EGR cooler and adjusts fuel distribution among the donor cylinders and non-donor cylinders based on a desired temperature of the EGR cooler.

At 802 of method 800, the temperature of the EGR cooler is determined. As described above, the temperature of the EGR cooler may be a core temperature of the EGR cooler. At 804, the temperature of the EGR cooler is compared to a desired temperature of the EGR cooler. During the high temperature mode, the desired temperature of the EGR cooler may be a relatively high temperature (e.g., a temperature higher than in a low temperature regeneration mode). In one example, the desired temperature of the EGR cooler may be in a range of 500-750° C. In other examples, the desired temperature may be less than 500° C. or greater than 750° C. At the high temperature, particulate matter that has built up in the EGR cooler may be removed by the high temperature exhaust gas, high velocity flow through the EGR cooler, thereby regenerating the EGR cooler.

At 806 of method 800, fuel distribution is adjusted responsive to the EGR cooler temperature to increase the fuel injection quantity to the donor cylinders preferentially from the non-donor cylinders according to the method 900 illustrated in FIG. 9. At 902, a number of non-donor cylinders to skip is determined. The number of donor cylinders to skip may be determined on the desired temperature of exhaust gas from the donor cylinders. For example, if the difference between the desired EGR cooler temperature and the EGR cooler temperature determined at 804 is relatively large, one or more non-donor cylinders may be skipped such that the fuel injection quantity may be increased in the donor cylinders in order to increase the temperature of the donor cylinder exhaust gas, thereby increasing the temperature of the EGR cooler. On the other hand, if the difference between the desired temperature of the EGR cooler and the current temperature is relatively small, it may be determined that no non-donor cylinders should be skip tired.

At 904, a fuel injection amount per cylinder is determined. The fuel injection amount per cylinder may be based on fuel demand, desired temperature of the donor cylinder exhaust gas, and the number of donor cylinders that are skipped (as determined at 902). The fuel injection amount to the donor cylinders may be based on the desired temperature of the donor cylinder exhaust gas. As an example, the fuel injection quantity to one or more of the donor cylinders may be increased in order to increase the donor cylinder exhaust gas temperature such that the temperature of the EGR cooler may be increased. The fuel injection quantity to the non-donor cylinders may be decreased in proportion to the induced fuel distribution to the donor cylinders. For example, if the fuel injection quantity is increased by 15% in each of the donor cylinders (e.g., four donor cylinders in the example depicted in FIG. 3), the fuel injection quantity may be reduced by 60% across the non-donor cylinders (e.g., each non-donor cylinder receives a 7.5% fuel reduction, four non-donor cylinders receive a 15% fuel increase, etc.). In some examples, the fuel injection quantity to the non-donor cylinders may be decreased such there is an even fuel distribution across the non-donor cylinders. In other examples, the fuel injection quantity to the non-donor cylinders may be increased such that there is an uneven fuel distribution across the non-donor cylinders. The amount of fuel injected to each cylinder may be based on air fuel ratio constraints, for example. As described above, the cylinders may have minimum and maximum air fuel ratio constraints based on the engine operating conditions. A fuel injection amount which results in an air fuel ratio that is too high or low may result in engine misfire, increased emissions, torque imbalance, and the like.

At 906, a tiring sequence is carried out with the determined fuel injection quantity to each of the cylinders. In one example, the fuel injection quantity ay be shifted from the non-donor cylinders to the donor cylinders such that the fuel injection quantity in every donor cylinder is increased, and fuel injection to at least one of the non-donor cylinders is cut-off. In other examples, the fuel injection quantity may be increased to a subset of the donor cylinders, while the fuel injection quantity is decreased to a subset of the non-donor cylinders. In yet another example, the fuel injection quantity may be increased to every donor cylinder, while fuel injection is cut-off to every non-donor cylinder.

As described above, in some embodiments, the fuel injection quantity to each cylinder may vary between engine cycles such that cylinder firing is balanced across engine cycles. As a non-limiting example, if non-donor cylinders 1, 7, 8, and 3 receive a 15% decrease of the fuel injection quantity and non-donor cylinders 4, 6, 11, and 12 receive a 5% decrease of the fuel injection quantity during a first engine cycle such that the fuel injection quantity to the donor cylinders is increased by 80%, non-donor cylinders 4, 6, 11, and 12 may receive a 5% decrease of the fuel injection quantity while non-donor cylinders 1, 7, 8, and 3 receive a 15% increase of the fuel injection quantity during the subsequent engine cycle, while the donor cylinders still receive a fuel injection quantity increase of 80%.

Thus, during the high temperature mode of regenerating the EGR cooler, the fuel injection quantity may be adjusted such that skipping of one or more of the non-donor cylinders occurs during an engine cycle. In this manner, a temperature of the exhaust gas exiting the donor cylinders may be increased such that a temperature of the EGR cooler may be increased in order o facilitate regeneration of the EGR cooler at high temperature.

Referring, now to FIG. 10, a method 1000 for increasing exhaust gas temperature by throttling the engine is depicted. At 1002 of method 1000, the temperature of the EGR cooler is determined. As described above, the temperature of the EGR cooler may be a core temperature of the EGR cooler. At 1004, the temperature of the EGR cooler is compared to a desired temperature of the EGR cooler. Based on the difference between the desired temperature the measured temperature of the EGR cooler, a throttle valve position and/or an EGR valve position may be adjusted at 1006. By adjusting the EGR valve, for example by moving the valve to a more restricted position, the exhaust backpressure may increase. The increased exhaust backpressure may create additional work for the engine, and as such necessitate additional fueling to the cylinders. As such, method 1000 may also include adjusting a fuel injection amount at 1008. By throttling the EGR and increasing a fuel injection amount, engine air-fuel ratio may be reduced. Additionally, adjusting the throttle valve to a more restricted position may decrease airflow to the engine, further lowering engine air-fuel ratio. A decreased engine air-fuel ratio may result in increased exhaust gas temperatures. Upon adjusting the fuel injection amount, method 1000 ends.

FIG. 11 is a flow chart illustrating a method 1100 for increasing exhaust temperature by operating a self-load system. As explained previously with respect to FIG. 1, a self-load system may be present in the rail vehicle. The self-load system may convert excess engine output to electricity via the alternator/generator, which may then be dissipated to one or more vehicle batteries or other energy storage devices, unloaded via the engine electrical system, and/or routed to a resistor grid, which dissipates the energy as heat. Thus, in the self-load mode, the engine is operated to generate excess torque and/or power beyond the traction motor demands by operating at a higher than necessary speed and load, the excess energy being dissipated to the self-load system. For example, the self-load system operation may include dissipating excess electrical power Generation through various devices, including the resistive grids 126 and/or to charge one or more of the batteries. At 1102 of method 1100, it is determined if the self-load system is below a capacity. The capacity may be a function of the storage state of one or more batteries coupled to the alternator generator. Further, the capacity may be a function of the load placed on the rail vehicle by the electrical system. For example, if the electrical system is at high demand, the self-load system may have a higher capacity to accept energy generated by the engine. Additionally, the temperature of the resistor grids may determine the capacity of the self-load system. If the resistor grids are above a threshold temperature, additional energy may not be routed to the grids, as the increase in temperature may cause degradation of the grids. Thus, at 1102, the capacity of the system is determined by monitoring battery state of charge, electrical system demand, and/or grid temperature. If the system is at capacity, method 1100 ends, as the self-load system cannot accept additional electrical energy generated by increased engine output.

On the other hand, if the self-load system is not at capacity, method 1100 proceeds to 1104 determine the temperature of the EGR cooler. At 1106, the temperature of the EGR cooler is compared to a desired temperature of the EGR cooler. Based on the difference between the desired temperature the measured temperature of the EGR cooler, the engine outputs increased in order to raise the temperature of the exhaust. The engine may be automatically operated by the controller to generate additional engine output beyond the traction load demands, for example, the engine output may be increased by increasing engine speed and load. Engine load is increased at 1108 by increasing a notch setting on the notch throttle, for example. At 1110, a fuel injection amount is adjusted, for example, increased to further increase engine speed and load. At 1112, the output from the engine is routed to the self-load system. In doing so, exhaust gas temperature may be increased to improve EGR cooler operation. Method 1100 then ends.

FIG. 12 is a flow chart illustrating a method 1200 for increasing exhaust gas temperature using a heater positioned upstream of the EGR cooler. The heater may be operated by electricity received from the alternator/generator. As such, at 1202, it is determined if the engine is in the self-load mode. During self-load, additional energy is routed to the alternator/generator, which may be used to power the heater. If the engine is not in self-load mode, the heater operation may create a burden on the engine and the rail vehicle power demand, and as such method 1200 ends if it is determined the engine is not operating in self-lode mode. If the engine is in self-mode, and/or if extra energy is available to operate the heater, method 1200 proceeds to 1204 to determine EGR cooler temperature, compare the EGR cooler temperature to desired temperature at 1206, and operate the heater 1208 to bring the cooler to the desired temperature. In some embodiments, the cooler may be heated to a relatively high temperature in order to perform an EGR cooler regeneration. In other embodiments, the heater may be operated just to keep the cooler above the dew point of the EGR, to avoid condensate building up in the cooler. In still other embodiments, the heater may be operated to bring the temperature of the exhaust gas to a level at which oil and fuel in the exhaust is vaporized. Upon operating the heater to bring the cooler to the desired temperature, method 1200 ends.

In some embodiments, the system may switch between high temperature and low temperature modes of regenerating the EGR cooler. For example, the system might switch between high temperature and low temperature mode in order make sure the particulate build-up is removed from the EGR cooler, as each mode regenerates the EGR cooler is a different way. As an example, the low temperature mode may be carried out for a predetermined amount of time (e.g., 2-5 hours), and then the high temperature mode may carried out. The high temperature may be an emissions performance mode, as exhaust gas is recirculated during the high temperature mode (and may not be recirculated during the low temperature mode) and $NO_x$ emission, for example, may be reduced. As such, the system may switch from the low temperature mode to the high temperature mode if $NO_x$ emission exceeds a threshold value. In another example, the system may switch between high temperature and low temperature modes based on a temperature of the engine coolant. For example, if the coolant temperature increases above a threshold temperature, the system may switch from the low temperature mode to the high temperature mode.

In some embodiments, the injection schedule among the donor cylinder group and the non-donor cylinder group may additionally or alternatively be adjusted responsive to the temperature of the exhaust gas recirculation cooler. The injection schedule may include injection timing, pressure, number of injections per cycle, and the like. In one example, during the high temperature mode, one or more donor cylinders may receive an additional post injection (e.g., a first injection for combustion near top dead center at the end of compression or beginning of expansion, and an additional injection of fuel late in the expansion or exhaust stroke to provide exhaust heat) in order to increase a temperature of the donor cylinder exhaust gas. In another example, during the high temperature mode, fuel rail pressure may be increased and injection timing may be advanced in one or more donor cylinders. In contrast, during the low temperature mode, fuel injection may be retarded in one or more donor cylinders such that donor cylinder exhaust temperature is decreased.

An embodiment relates to a control module. The control module may be a hardware and/or software module, meaning the module includes one or more of the following: electronic components configured to operate to perform the indicated function(s); or control instructions (e.g., stored on non-transitory tangible medium) that when executed by a controller- or processor-based device cause the controller- or processor-based device to perform the indicated function(s). The control module is configured to be operably coupled with, and/or to control a controller- or processor-based device operably coupled with, an engine system having a donor cylinder group, a non-donor cylinder group, and an exhaust gas recirculation cooler; the exhaust gas recirculation cooler is operably coupled between the donor cylinder group and an air intake of the engine system. The control module is configured to control the engine system for adjusting fuel distribution among the donor cylinder group and the non-donor cylinder group responsive to a temperature of the exhaust gas recirculation cooler. In another embodiment, the control module is configured to identify an effectivity of the exhaust gas recirculation cooler, and, based on the effectivity of the exhaust gas recirculation cooler, to initiate regeneration of the exhaust gas recirculation cooler by controlling the engine system for adjusting fuel distribution among the donor cylinder group and the non-donor cylinder group. In another embodiment, the control module is additionally configured to control operation of the engine system in a high temperature mode and a low temperature mode as described above.

As explained above, the terms "high temperature" and "low temperature" are relative, meaning that "high" temperature is a temperature higher than a "low" temperature. Conversely, a "low" temperature is a temperature lower than a "high" temperature.

In still other embodiments, the temperature of the EGR cooler may be controlled based on the fuel distribution among the donor cylinder group and the non-donor cylinder group. For example, when a fuel injection quantity to the donor cylinder group is decreased, an exhaust gas temperature of the donor cylinder group may correspondingly decrease, thereby decreasing a temperature of EGR flow and thus the EGR cooler. In this manner, the EGR cooler may be regenerated, as particulate build-up in the EGR cooler hydrolyzes due to the low temperature such that it may break off in the exhaust flow.

Further, when a fuel injection quantity to the donor cylinder group increases, the exhaust gas temperature of the donor cylinder group may correspondingly increase, thereby increasing a temperature of EGR flow and thus the EGR cooler. During both conditions, engine speed and/or load may be increased to increase exhaust flow through the EGR cooler. In this way, the EGR cooler may be regenerated, as particulate build-up in the EGR cooler may be removed by the high temperature exhaust flow. Thus, the EGR cooler may be regenerated under high and/or low exhaust temperature conditions such that the effectiveness of the EGR cooler may increased or maintained.

Thus, the systems and methods presented herein provide for a method, comprising initiating an EGR cooler regeneration mode, wherein the EGR cooler regeneration mode comprises changing a fuel distribution of a donor cylinder group relative to a non-donor cylinder group of an engine, and increasing at least one of engine speed or load of the engine. In some embodiments, the EGR cooler regeneration mode may be initiated in response to an effectiveness level of the EGR cooler being below a threshold. Thus, if particulate matter has built up on the cooler to a point where the cooler no longer effectively cools the EGR, the regeneration mode may be initiated. However, in other embodiments, the EGR cooler regeneration mode may be initiated proactively, even if the EGR cooler effectiveness level is above the threshold. For example, if the engine is operating under low load conditions, the EGR cooler regeneration mode may be initiated to prevent EGR cooler fouling.

The EGR cooler regeneration mode may include changing fuel distribution among a donor cylinder group of the engine and a non-donor cylinder group of the engine to either increase or decrease exhaust temperature through the EGR cooler. By increasing exhaust temperature through the cooler, soot or other particulate matter in the cooler may be burned off. On the other hand, if the exhaust temperature through the cooler is decreased, soot in the cooler may be flaked off.

Alternatively or additionally, the exhaust temperature may be increased by additional mechanisms during the EGR cooler regeneration mode. For example, a heater upstream of the EGR cooler may be operated to increase exhaust temperature through the cooler. Further, the engine may be automatically operated to generate additional engine output beyond traction load demands, and the additional engine output dissipated via a self-load system of the rail vehicle. In another example, the exhaust may be throttled by adjusting an EGR valve position and/or adjusted a throttle valve, in order to increase exhaust backpressure and allow for higher fueling rates, which result in increased exhaust temperature.

Each of the mechanisms for regenerating the EGR cooler or preventing EGR cooler fouling may be performed individually or in combination. For example, in some conditions the engine may be operated with selective fueling of the donor cylinders and with operation of the heater upstream of the cooler, with operation to generate additional engine output, with throttling of the exhaust, and/or with increasing engine speed and load. In other conditions, the engine may be operated without selective fueling but with one or more of increasing engine speed and load, automatically generating additional engine output, throttling the exhaust, or operating the heater upstream of the cooler.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein". Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   initiating an EGR cooler regeneration mode, wherein the EGR cooler regeneration mode comprises:
   changing a fuel distribution of a donor cylinder group relative to a non-donor cylinder group of an engine; and
   increasing at least one of engine speed or load of the engine,
   wherein changing the fuel distribution comprises adjusting the fuel distribution to decrease a fuel injection quantity to one or more cylinders of the donor cylinder group from the non-donor cylinder group to decrease a temperature of the EGR cooler if the temperature of the EGR cooler is less than a threshold temperature.

2. The method of claim 1, wherein increasing the at least one of engine speed or load further comprises increasing engine speed and load and dissipating excess power to a self-load system.

3. The method of claim 1, wherein adjusting the fuel distribution to decrease a fuel injection quantity to one or more cylinders of the donor cylinder group from the non-donor cylinder group further comprises increasing a fuel injection quantity to one or more cylinders of the non-donor cylinder group in correspondence to the decrease in the fuel injection quantity to the one or more cylinders of the donor cylinder group.

4. The method of claim 1, wherein changing the fuel distribution further comprises adjusting the fuel distribution to increase the fuel injection quantity to one or more cylinders of the donor cylinder group from the non-donor cylinder group if the temperature of the EGR cooler is greater than the threshold temperature.

5. The method of claim 4, further comprising operating a heater upstream of the EGR cooler if the temperature of the EGR cooler is greater than the threshold temperature.

6. The method of claim 4, further comprising decreasing a combustion air-fuel ratio of the engine if the temperature of the EGR cooler is greater than the threshold temperature.

7. The method of claim 6, wherein decreasing the combustion air-fuel ratio comprises increasing exhaust backpressure by adjusting an EGR valve position of an EGR valve of an EGR system.

8. The method of claim 1, wherein the EGR cooler regeneration mode is initiated based on effectiveness level of the EGR cooler, and wherein the effectiveness level of the EGR cooler is based on a ratio of heat transfer into and out of the EGR cooler.

9. The method of claim 8, wherein changing the fuel distribution of the donor cylinder group relative to the non-donor cylinder group of the engine and increasing at least one of the engine speed or load occur if the effectiveness level of the EGR cooler is below the threshold.

10. A method for engine, comprising:
   initiating an EGR cooler regeneration mode of an EGR cooler of an EGR system coupled to the engine based on a determined EGR cooler effectiveness level, wherein the EGR cooler regeneration mode comprises:
   operating the engine to generate additional engine output beyond a traction load, and dissipating excess electrical energy generated from the additional engine output to a self-load system;
   transferring energy from the self-load system to a heater upstream of the EGR cooler; and
   decreasing an air-fuel ratio in at least one cylinder of a donor cylinder group of the engine by:
      adjusting fuel distribution among the donor cylinder group and a non-donor cylinder group of the engine to increase a fuel injection quantity to the at least one cylinder of the donor cylinder group and decreasing a fuel injection quantity to the non-donor cylinder group in proportion to the induced fuel distribution to the donor cylinder; and
      adjusting one or more of a throttle valve position of a throttle valve of the engine or an EGR valve position of an EGR valve of the EGR system.

11. The method of claim 10, wherein the effectiveness level of the EGR cooler is based on a ratio of heat transfer into and out of the EGR cooler, and wherein the EGR cooler regeneration mode is initiated if the effectiveness level is below a threshold.

12. A method for an engine, comprising:
   during one or more select conditions where a self-load system is below capacity,
      operating the engine to generate additional engine output beyond a traction load, and dissipating excess electrical energy generated from the additional engine output to the self-load system; and
      routing at least a portion of engine exhaust gas through an EGR cooler positioned in an EGR system of the engine concurrent with operating the engine to generate the additional engine output.

13. The method of claim 12, where the operating of the engine to generate the additional engine output occurs while routing at least the portion of engine exhaust gas through the EGR cooler.

14. The method of claim 12, wherein capacity of the self-load system is determined based on one or more of a battery state of charge of a battery associated with the engine, an engine electrical load of the engine, or a resistor grid temperature of a resistor grid of the self-load system.

15. The method of claim 12, wherein one or more select conditions comprise the engine being in an idle mode of operation.

16. The method of claim 12, wherein the one or more select conditions comprise the EGR system being operated in an EGR cooler regeneration mode.

17. The method of claim 12, wherein during at least part of a time period when the EGR system is operated in the EGR cooler regeneration mode, the engine is automatically operated by a controller of the engine to generate the additional engine output beyond the traction load.

18. The engine method of claim 12, further comprising at least one of operating a heater upstream of the EGR cooler and increasing exhaust backpressure by adjusting an EGR valve position of an EGR valve of the EGR system during at least one of the one or more select conditions.

\* \* \* \* \*